US009479826B2

(12) United States Patent
Wu et al.

(10) Patent No.: US 9,479,826 B2
(45) Date of Patent: Oct. 25, 2016

(54) METHOD AND SYSTEM FOR WIRELESS DATA COMMUNICATION

(75) Inventors: Yiyan Wu, Kanata (CA); Bo Rong, Ottawa (CA); Gilles Gagnon, Gatineau (CA); Khalil Salehian, Ottawa (CA); Sébastien Laflèche, Gatineau (CA); Charles Nadeau, Gatineau (CA); Benoit Ledoux, Gatineau (CA); Robert Gagnon, Orleans (CA); Douglas Prendergast, Ottawa (CA)

(73) Assignee: Her Majesty the Queen in Right of Canada as represented by the Minister of industry, through the Communications Research Centre Canada, Ottawa, Ontario (CA)

( * ) Notice: Subject to any disclaimer, the term of this patent is extended or adjusted under 35 U.S.C. 154(b) by 54 days.

(21) Appl. No.: 13/440,247

(22) Filed: Apr. 5, 2012

(65) Prior Publication Data

US 2012/0257643 A1   Oct. 11, 2012

Related U.S. Application Data

(60) Provisional application No. 61/473,187, filed on Apr. 8, 2011.

(51) Int. Cl.
| | |
|---|---|
| *H04J 3/10* | (2006.01) |
| *H04N 21/438* | (2011.01) |
| *H04L 5/04* | (2006.01) |
| *H04N 21/2383* | (2011.01) |

(Continued)

(52) U.S. Cl.
CPC ............ *H04N 21/4382* (2013.01); *H04L 5/04* (2013.01); *H04N 21/2383* (2013.01); *H04N 21/4302* (2013.01); *H04N 21/6112* (2013.01); *H04N 21/6131* (2013.01); *H04L 27/2601* (2013.01)

(58) Field of Classification Search
None
See application file for complete search history.

(56) References Cited

U.S. PATENT DOCUMENTS

| | | | | |
|---|---|---|---|---|
| 5,710,797 | A | * | 1/1998 | Segal et al. ............... 375/346 |
| 6,377,636 | B1 | * | 4/2002 | Paulraj et al. ............ 375/346 |

(Continued)

OTHER PUBLICATIONS

Anders Mattsson, Single Frequency Networks in DTV, IEEE Transactions on Broadcasting, vol. 51, No. 4, Dec. 2005, pp. 413-422.

(Continued)

*Primary Examiner* — Steve Young
(74) *Attorney, Agent, or Firm* — Teitelbaum & MacLean; Neil Teitelbaum; Doug MacLean

(57) ABSTRACT

A system has a first transmitter for transmitting a first wireless signal within a first frequency. A second transmitter is for transmitting a second wireless signal with overlapping frequency. The first transmitter and the second transmitter are disposed sufficiently proximate to another such that the wireless signals substantially interfere resulting in a combined wireless signal with negative SNR for each of the first wireless signal and the second wireless signal, the negative SNR being a result of at least the other of the first wireless signal and the second wireless signal. A receiver is located for receiving a received wireless signal comprising substantially interfering encoded data signals having negative SNR. The receiver is for selecting from the substantially interfering encoded data signals a signal of interest and for decoding said signal of interest relative to at least the other substantially interfering data signal within the received wireless signal.

10 Claims, 16 Drawing Sheets

(51) Int. Cl.
*H04N 21/43* (2011.01)
*H04N 21/61* (2011.01)
*H04L 27/26* (2006.01)

(56) References Cited

U.S. PATENT DOCUMENTS

| | | | | |
|---|---|---|---|---|
| 6,453,291 | B1* | 9/2002 | Ashley | G10L 25/78 704/200 |
| 6,738,492 | B1* | 5/2004 | Kondo et al. | 382/100 |
| 6,760,370 | B2* | 7/2004 | Li | H04L 1/20 375/227 |
| 7,154,958 | B2* | 12/2006 | Dabak | H04J 13/00 370/335 |
| 7,202,914 | B2 | 4/2007 | Wu et al. | |
| 7,307,666 | B2 | 12/2007 | Wu et al. | |
| 7,505,440 | B2* | 3/2009 | Sun et al. | 370/335 |
| 7,936,705 | B1* | 5/2011 | Boland | 370/260 |
| 8,588,835 | B2* | 11/2013 | Inoue | H04W 16/28 455/115.3 |
| 2002/0051435 | A1* | 5/2002 | Giallorenzi | H04B 7/2621 370/335 |
| 2003/0012187 | A1* | 1/2003 | Avery | 370/389 |
| 2003/0026223 | A1* | 2/2003 | Eriksson et al. | 370/335 |
| 2004/0146014 | A1* | 7/2004 | Hammons, Jr. | H04L 1/0059 370/320 |
| 2006/0153315 | A1* | 7/2006 | Chen | H04B 7/18515 375/295 |
| 2009/0067382 | A1* | 3/2009 | Li et al. | 370/330 |
| 2010/0195768 | A1* | 8/2010 | Krakowski | 375/320 |
| 2011/0019758 | A1* | 1/2011 | Stadelmeier et al. | 375/267 |
| 2011/0124291 | A1* | 5/2011 | Gurney | H04W 16/14 455/63.2 |

OTHER PUBLICATIONS

Gorka Guerra; Pablo Angueira; Manuel M. Velez; David Guerra; Gorka Prieto; Juan Luis Ordiales; Amaia Arrinda; Field Measurement Based Characterization of the Wideband Urban Multipath Channel for Portable DTV Reception in Single Frequency Networks, IEEE Transactions on Broadcasting, vol. 51, No. 2, Jun. 2005, pp. 171-179.

Pablo Angueira; Manuel M. Velez; David de la Vega; David Guerra; Gorka Prieto; Jose Maria Matias; Juan Luis Ordiales; DTV Reception Quality Field Tests for Portable Outdoor Reception in a Single Frequency Network, IEEE Transactions on Broadcasting, vol. 50, No. 1, Mar. 2004, pp. 42-48.

Agnes Ligeti and Jens Zander; Minimal Cost Coverage Planning for Single Frequency Networks, IEEE Transactions on Broadcasting, vol. 45, No. 1, Mar. 1999, pp. 78-87.

Seung Won Kim; Yong Tae Lee; Sung Ik Park; Ho Min Eum; Jae Hyun Seo; Heung Mook Kim; Equilization Digital On-Channel Repeater in the Single Frequency Networks; IEEE Transactions on Broadcasting, vol. 52, No. 2, Jun. 2006, pp. 137-146.

Gunther May and Peter Unger; A New Approach for Transmitting Local Content Within Digital Single Frequency Broadcast Networks; IEEE Transactions on Broadcasting, vol. 53, No. 4, Dec. 2007, pp. 732-737.

Xianbin Wang; Yiyan Wu and Bernard Caron; Transmitter Identification Using Embedded Pseudo Random Sequences; IEEE Transactions on Broadcasting, vol. 50, No. 3, Sep. 2004, pp. 244-252.

Sung Ik Park; Jae-Young Lee; Heung Mook Kim; Wangrok Oh; Transmitter Identification Signal Analyzer for Single Frequency Network; IEEE Transactions on Broadcasting, vol. 54, No. 3, Sep. 2008, pp. 383-393.

Sung Ik Park; Heung Mook Kim; Wangrok Oh; Reception Power Estimation Using Transmitter Identification Signal for Single Frequency Network; IEEE Transactions on Broadcasting, vol. 55, No. 3, Sep. 2009, pp. 652-655.

ATSC—Mobile DTV Standard, Part 2—RF/Transmission System Characteristics; Document A/153 Part 2:2011, Oct. 7, 2011; Washington, D.C.

R. G. Gallager; Low-Density Parity-Check Codes*; 1962 IRE Transactions on Information Theory, pp. 21-28.

Claude Berrou and Alain Glavieux; Near Optimum Error Correcting Coding and Decoding: Turbo-Codes; IEEE Transactions on Communications, vol. 44, No. 10, Oct. 1996, pp. 1261-1271.

G. David Forney, Jr.; Convolutional Codes I: Algebraic Structure; IEEE Transactions on Information Theory, vol. IT-16, No. 6, Nov. 1970, pp. 720-738.

* cited by examiner

METHOD AND SYSTEM FOR WIRELESS DATA COMMUNICATION

FIELD OF THE INVENTION

The invention relates generally to wireless communication and more particularly to systems suitable for wireless broadcasting.

BACKGROUND

Spread spectrum technique transmits information over a wide range of frequencies. By spreading data over multiple frequencies robustness is enhanced. That said, spreading data over multiple frequencies requires greater bandwidth for the signal being modulated. This "spreading" is accomplished by modulating the signal twice, once with a carrier and then modulating the result with a Pseudorandom sequence. The spreading of the spectrum has some great benefits like resistance to jamming, resistance to interception, resistance to fading, and multiple access capabilities (e.g. CDMA). The direct spread spectrum system can also eliminate the impact of multipath distortion and reach a low SNR threshold.

CDMA system is usually recognized as an access technology for multiuser point-to-point communication. However, for a given system bandwidth, spectrum spreading limits peak user data rate to a relatively low value. Due to its low spectrum efficiency, the CDMA system was designed as an access technology for point-to-point communication, not for high-speed broadcasting or multicasting, which are point-to-multipoint services. Moreover, it has to apply a same modulation scheme, when multiplexing multiple data streams in CDMA. This significantly reduces flexibility, for example for hierarchical spectrum reuse.

Another method of data communication involves communication cells having known frequency characteristics. Here, a cell is associated with a carrier frequency and adjacent cells are each associated with other carrier frequencies such that intercell interference is limited. Unfortunately, even if the system only requires 4 carrier frequencies such a system reduces available bandwidth for each cell by 75%.

For broadcast communication, spectral efficiency and robustness are very important. That said, it has become apparent that differentiating broadcast signals—for example for local commercial insertion—is also of value. To date, this has been accomplished via wired communication or via local broadcasters broadcasting on their own frequencies such that the same information is broadcast numerous times by numerous broadcasters. Unfortunately, such a system is difficult to manage and is quite inefficient spectrally.

It would be advantageous to overcome some of the drawbacks of the prior art.

SUMMARY OF EMBODIMENTS OF THE INVENTION

In accordance with an aspect of at least one embodiment of the invention there is provided a transmitter comprising: at least a first input port for receiving a first signal and a second signal; at least an encoder for encoding the first signal and the second signal to form at least an encoded signal for being detected in a received signal having a negative signal to noise ratio (SNR) and identifiable one relative to the other within the signal having negative SNR; and at least an antenna for transmitting a wireless signal comprising the at least an encoded signal comprising the encoded first signal and the encoded second other signal, the encoded first signal transmitted with a first carrier frequency and the encoded second signal transmitted with an approximately same carrier frequency, the transmitted encoded first signal and the transmitted encoded second signal mutually interfering one with another for resulting in a signal having a negative SNR, the transmitted at least an encoded signal at a receiver for simultaneously receiving the first signal and the second signal having decoded therefrom at least one of the first signal and the second signal and having selected therebetween a signal of interest.

In accordance with an aspect of at least one embodiment of the invention there is provided a method comprising: transmitting from an approximately same location a first signal and a second signal, the first signal transmitted with a first carrier frequency and the second signal transmitted with overlapping frequency, the second signal and the first signal each encoded for being detected in a received signal having a negative signal to noise ratio (SNR), the first signal and the second signal mutually interfering one with another for resulting in a signal having a negative SNR, the first signal and the second signal identifiable one relative to the other for at a receiver simultaneously receiving the first signal and the second signal having decoded at least one of the first signal and the second signal and having selected therebetween a signal of interest.

In accordance with an aspect of at least one embodiment of the invention there is provided a method comprising: receiving a wireless signal encoded for supporting a negative signal to noise ratio and providing a first received signal; processing the first received signal to identify therein a first data signal at a first frequency, the first data signal encoded for supporting isolation thereof within a signal having a negative signal to noise ratio; processing the first received signal to identify therein a second other data signal at the first frequency, the second other data signal encoded for supporting isolation thereof within a signal having a negative signal to noise ratio; selecting between the first data signal and the second other data signal a signal of interest; and decoding the signal of interest and providing same as an output signal.

In accordance with an aspect of at least one embodiment of the invention there is provided a system comprising: an antenna for receiving a wireless signal and for providing a first received signal; and a processor for processing the first received signal to isolate therein a first data signal at a first frequency, the first data signal encoded for supporting isolation thereof within a signal having a negative signal to noise ratio, for processing the first received signal to isolate therein a second other data signal at the first frequency, the second other data signal encoded for supporting isolation thereof within a signal having a negative signal to noise ratio, and for selecting between the first data signal and the second other data signal a signal of interest, and for decoding the signal of interest and providing same as an output signal therefrom.

In accordance with an aspect of at least one embodiment of the invention there is provided a system comprising: a first transmitter disposed for transmitting a first wireless signal with a first carrier frequency; a second transmitter disposed for transmitting a second wireless signal with the first carrier frequency, the first transmitter and the second transmitter disposed sufficiently proximate one to another for resulting in the wireless signals substantially interfering one with the other for resulting in a wireless signal having a negative signal to noise ratio (SNR) for at least one of the first wireless signal and the second wireless signal, the negative SNR a result of at least the other of the first wireless signal and the second wireless signal; and a receiver for receiving a received wireless signal comprising substantially interfering encoded data signals having negative SNR and for selecting from the substantially interfering encoded data signals a signal of interest and for decoding said signal of interest relative to at least the other substantially interfering data signal within the received wireless signal.

In accordance with an aspect of at least one embodiment of the invention there is provided a network comprising: a plurality of transmitters each disposed for transmitting a same first wireless signal with a same first carrier frequency, each of the plurality of transmitters having overlapping coverage areas with other of the plurality of transmitters, the plurality of transmitters other than disposed and tuned for supporting predetermined multipath delay spread limits.

In accordance with an aspect of at least one embodiment of the invention there is provided a network comprising: a plurality of transmitters each disposed for transmitting a different first wireless signal with a same first carrier frequency, each of the plurality of transmitters having overlapping coverage areas with other of the plurality of transmitters.

In accordance with an aspect of at least one embodiment of the invention there is provided a method comprising: providing a transmitter for supporting a plurality of encodings for supporting a received signal having a negative signal to noise ratio (SNR); receiving at least a first signal from at least one other transmitter; and determining an encoding process for encoding a second signal for transmission such that said second signal is differentiated from the at least a first signal, for at a receiver simultaneously receiving the at least a first signal and the second signal, decoding at least one of the first signal and the second signal, and selecting therebetween a signal of interest.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Existing DTV systems were mostly developed 10-20 years ago but suitable technologies have advanced considerably over the years. For example, most of the DTV systems now in operation rely on MPEG-2 video coding, while more recent H.264 or AVC standard achieve the same video quality with about one half the data rate in comparison to MPEG-2. High Efficiency Video Coding (HEVC), currently under development, should further cut the data rate by 50% for HDTV service. The advances in the near-Shannon-limit error correction codes such as LDPC code, and diversity techniques such as MIMO and MISO, as well as joint source and channel coding and cross-layer error correction schemes all potentially contribute to the reduction of data rate or reception threshold. Based on the information theory, there are two ways to improve the spectrum efficiency—increasing data throughput and increasing reception robustness.

An apparently simple method to overcome spectral utilization efficiency in broadcast networks is to broadcast identical information from every transmitter. Unfortunately, in order for such a system to function simply, it is at the receiver that the information must be identical—synchronized—which is not a trivial task. Multipath delays and other unsynchronized signals all need to be accounted for. In a conventional Single Frequency Network (SFN), all transmitters emit identical signals on the same RF channel. The signals from different transmitters are frequency and phase locked, and their emission timings are carefully adjusted to control multipath delay spreads within a coverage area, so that they are within a guard interval range or a range of equalizer capability. Synchronizing transmitters is a complex task in comparison to maintaining delay spreads required by prior art approaches. Therefore, maintaining independence of different transmitters remains advantageous, even when less spectrally efficient.

Figure 1A:
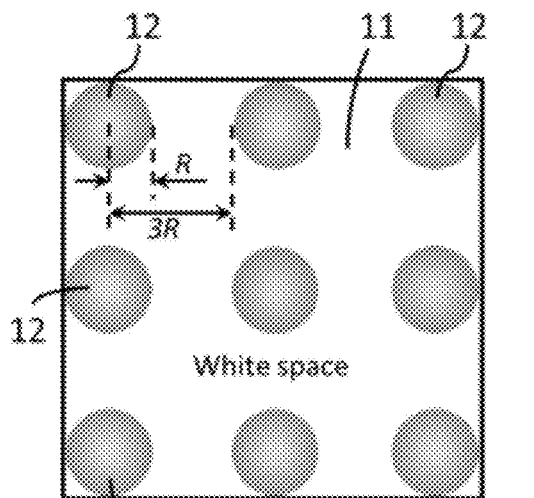
FIG. 1A is a transmission area map showing spacing between signals within same spectrum.
Figure 1B:
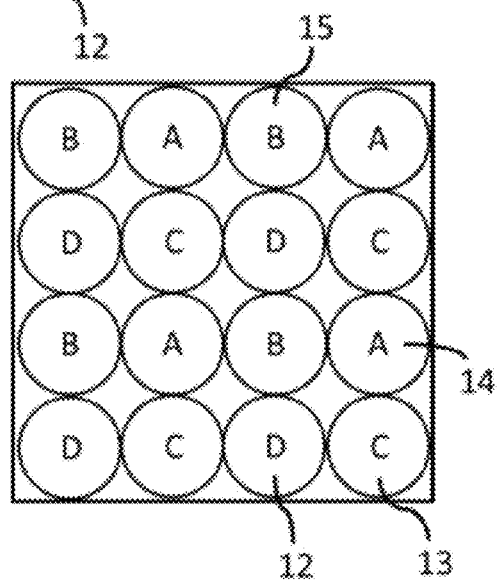
FIG. 1B is a transmission area map showing spacing between signals within same spectrum.
Figure 1C:
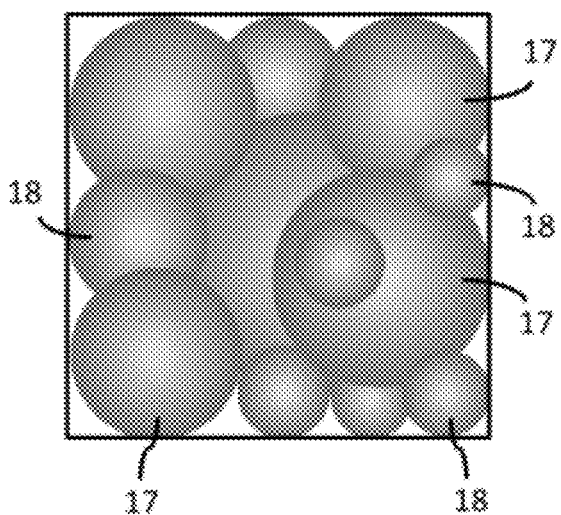
FIG. 1C is a transmission area map showing overlapping spectral signals within same spectrum.

Referring to FIGS. 1A, 1B, and 1C shown are transmission area maps showing spacing between signals within same spectrum in FIGS. 1A and 1B and can be showing overlapping spectral signals in FIG. 1C. As can be seen in FIG. 1A, there are large amounts of "White-Spaces" 11 that are not used for broadcast service for existing DTV systems. The shaded areas 12 in FIG. 1A, or spatial coverage efficiency for co-channel assignment, are only about 28% of the total area. This indicates that in a city/market less than 30% of the RF channels are used for broadcast services. In North America, the DTV spectrum allotment takes into consideration channels 2 to 51. This means that on average only about 15 RF channels are used in a major city/market. FIG. 1B shows a 1 in 4 spectrum allotment plan for the broadcast service. Shaded areas 12 are for transmission within a first band while shaded areas 13, 14, and 15 are for transmission within each of three other bands. It is evident that the existing systems and spectrum allotment plans do not provide a very efficient use of the spectrum over the spatial domain.

Referring now to FIG. 1C, shown are overlapping spectral signals 17 and 18. Where two signals overlap, as noted above, the existing systems impose strict limitations on those signals carrying identical content within a certain phase spread. As shown, even though for the most part an area covered by 17 does not overlap with an area covered by 18, the restrictions must still be imposed or reception in overlapping areas is not supported.

Generally speaking, there are two types of co-channel interferences: Type 1, which is generated by two or more transmitters that emit different, uncorrelated signals behaving like AWGN; and Type 2, which is created by two or more transmitters emitting an identical program, similar to the multipath distortion situation observed under a Single Frequency Network (SFN) environment. It is this second type of distortion that is controlled by the restrictions. The first type of distortion being controlled other ways. However, it has now been found that co-channel signals from different SFN transmitters arriving at a reception site will degrade into Type 1 co-channel interference if the multipath delay spread is longer than the guard interval or equalizer range. This is also the case when there is no equalizer implemented in the receiver.

The most severe multipath distortion is the 0 dB "echo", where main path and secondary path (multipath) signals have the same power level at a receiver and are separated by a time delta(t). When the two signals are treated as Type 1 co-channel interference one relative to the other, it is possible to address the noise with a robust error correction capability. The system, for example identifies, synchronizes, and tracks the highest level signal path to decode the signal. Thus, to account for the most severe case above, an embodiment has an AWGN threshold below 0 dB and preferably below −2 to −3 dB in order to tolerate a 0 dB "echo" without requiring an adaptive equalizer/guard interval. The multipath distortion is thus treated as Type 1 co-channel interference by the system, eliminating a need to treat the two types of interference separately.

In the above proposed system, Type 1 co-channel interferences occur in transmitter coverage overlapping areas. As discussed before, the proposed system can withstand strong co-channel interference and, for example, synchronize to a strongest signal path. This means that the transmitters can be placed within a designated service area and transmit the same or different programs within a same frequency band or channel, as presented in FIG. 1C, while maintaining flexibility in transmitter and receiver design and placement.

Figure 2:
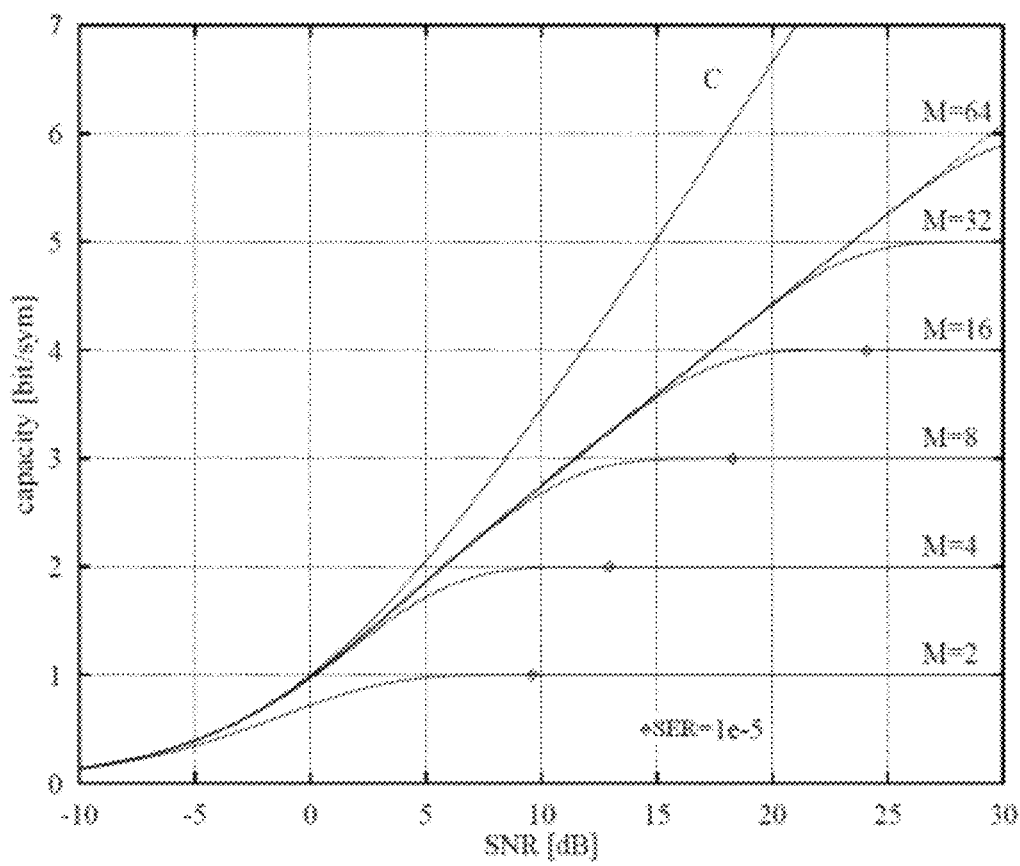
FIG. 2 is a graph graphical representation showing Shannon limits for different modulation systems.

Based on information theory, if a system has a low receiving threshold, its data rate is also very low, representing a typical case of trading robustness for data rate. FIG. 2 provides the Shannon limits for different modulation systems. It can be seen that if a SNR threshold of −2 to −3 dB is targeted, the spectrum efficiency will be around 0.4 to 0.5 bits/s/Hz. For a 6 MHz bandwidth RF channel, the total data rate is 2.4 to 3 Mbps (for 8 MHz Channel, 3.2 to 4 Mbps). It is not presently realistic to provide HDTV service at this data rate but it is presently possible to provide more than one good quality SDTV program for mobile, pedestrian and indoor services.

Figure 3:
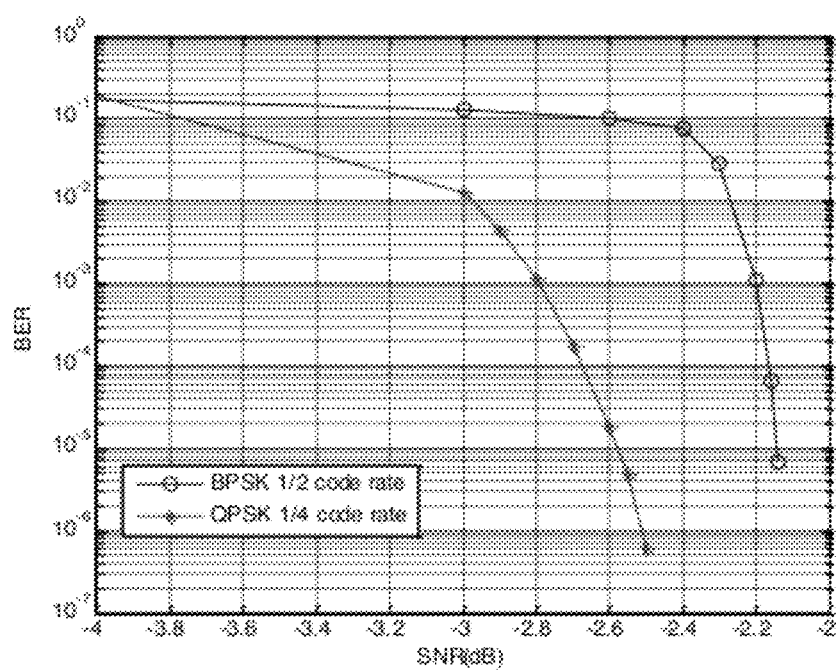
FIG. 3 is a graphical representation of BER vs. SNR for different modulation schemes.

A major advantage of using multi-carrier modulation system (OFDM) is robustness against multipath distortion. As multipath distortion is not a primary concern in the present embodiment, this may not present similar advantages over other modulation systems; however, an OFDM system may provide more spectrum efficiency, for example, it might be possible to use 95% of an RF spectrum, while with a single carrier modulation, because of a channel shaping filter, efficiency may be a few percentage points less. Meanwhile, for channel bonding and aggregation, using OFDM may be easier and more flexible. Moreover, as it is shown in FIG. 2, in the SNR range of −5 to 0 dB, QPSK has better spectrum efficiency than that of BPSK. The result of further studies is shown in FIG. 3, which presents simulation results of BER vs. SNR for BPSK and QPSK modulations with code rates of one half and one quarter, respectively. Those simulations were performed using the DVB-T2 64 k LDPC code. As expected, QPSK with R=1/4 code worked better. At BER=1E-4, the QPSK R=1/4 code combination has about 0.5 dB advantage. Of course, LDPC codes, fast channel zapping, and low power consumption decoding, as they exist or as they develop in the future, are also suitable options.

As discussed above, although the system of the present embodiment is very robust, its data rate is low. In another embodiment system data throughput is increased by co-locating two transmitters, transmitting two signals within a same frequency band or channel from a same tower and optionally from a same antenna. This is possible because the system withstands strong co-channel interference, up to −2 to −3 dB. This effectively doubles system data throughput—providing 0.8 to 1.0 bits/s/Hz spectrum efficiency or 5 to 6 Mbps data rate in a 6 MHz RF channel. Such a system optionally provides a HDTV service using HEVC. Alternatively, such a system is used to transmit different signals within a same or different regions.

Figure 4:
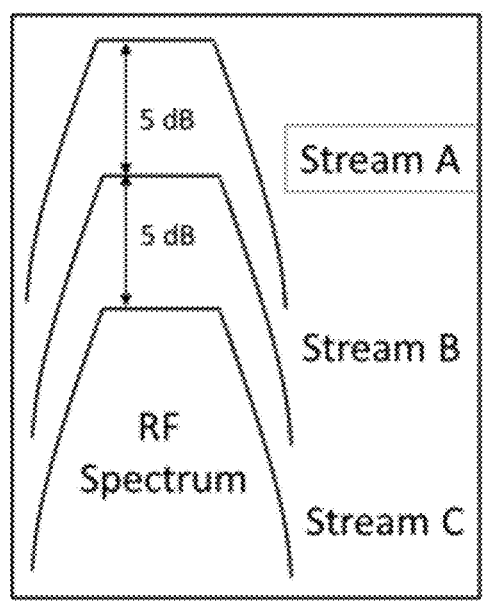
FIG. 4 is a graphical representation of an amplitude of transmission of each of three streams vs. a frequency thereof.

Since the above described system is robust, it further allows use of hierarchical spectrum re-use to increase data throughput. It is possible to insert a second digital stream (Stream B), e.g., a DVB-T2 signal, that is frequency locked and clock synchronized with the first signal (Stream A). The injection level, for example, can be 5 dB below the Stream A as shown in FIG. 4. The spectrum efficiency of the Stream B system is optionally around 1 bit/s/Hz with a SNR threshold of 1 dB (DVB-T2 parameter). The combined system spectrum efficiency will be about 1.5 bits/s/Hz.

In the receiver, Stream A is first decoded to reduce or eliminate transmission errors. The decoded signal is then fed back and subtracted from the received combined signal (Stream A+B). The resulting difference signal is then used to decode Stream B (e.g., DVB-T2). To successfully decode the Stream B, assuming it is injected at 5 dB below the Stream A, a cancelation gain of about 10 dB on the Stream A signal is implemented. This is achievable. A third data Stream C, is optionally injected at 5 dB below Stream B, as shown in FIG. 4. The total system spectrum efficiency will then approach 2 bits/s/Hz.

Since the above described network supports more than one layer of data services or streams, progressive network roll outs are supported. Stream A layer can be implemented first with low power transmission on Taboo or White Space channels. For example, this could reduce interference to the existing DTV services. Stream B can be added at a later time. When existing DTV services are switched off, network power can be increased to provide better coverage and based on service demand, additional data streams can be implemented/added. In this way, the above described network is scalable. Progressive implementation of the network, layer by layer, gives broadcasters more control of their business plan—how many layers of streams are needed and when to implement them—and provides an ordered transition to the new system.

Receivers are also optionally rolled out progressively with backward compatible support. The early receivers are implemented, for example, to receive Stream A signal. Later, when Stream B is implemented, there will be a demand for receivers that receive both Stream A and Stream B. Meanwhile, the early generation of receivers designed for Stream A will not go dark and will continue to receive Stream A. There will be different types of receivers: handsets, set top box, IRD TV and 3D-TV for different services, such as mobile, portable, and fixed. They can decode (or tune in) all available data streams or part of the streams depending on the applications and what they support.

Figure 5:
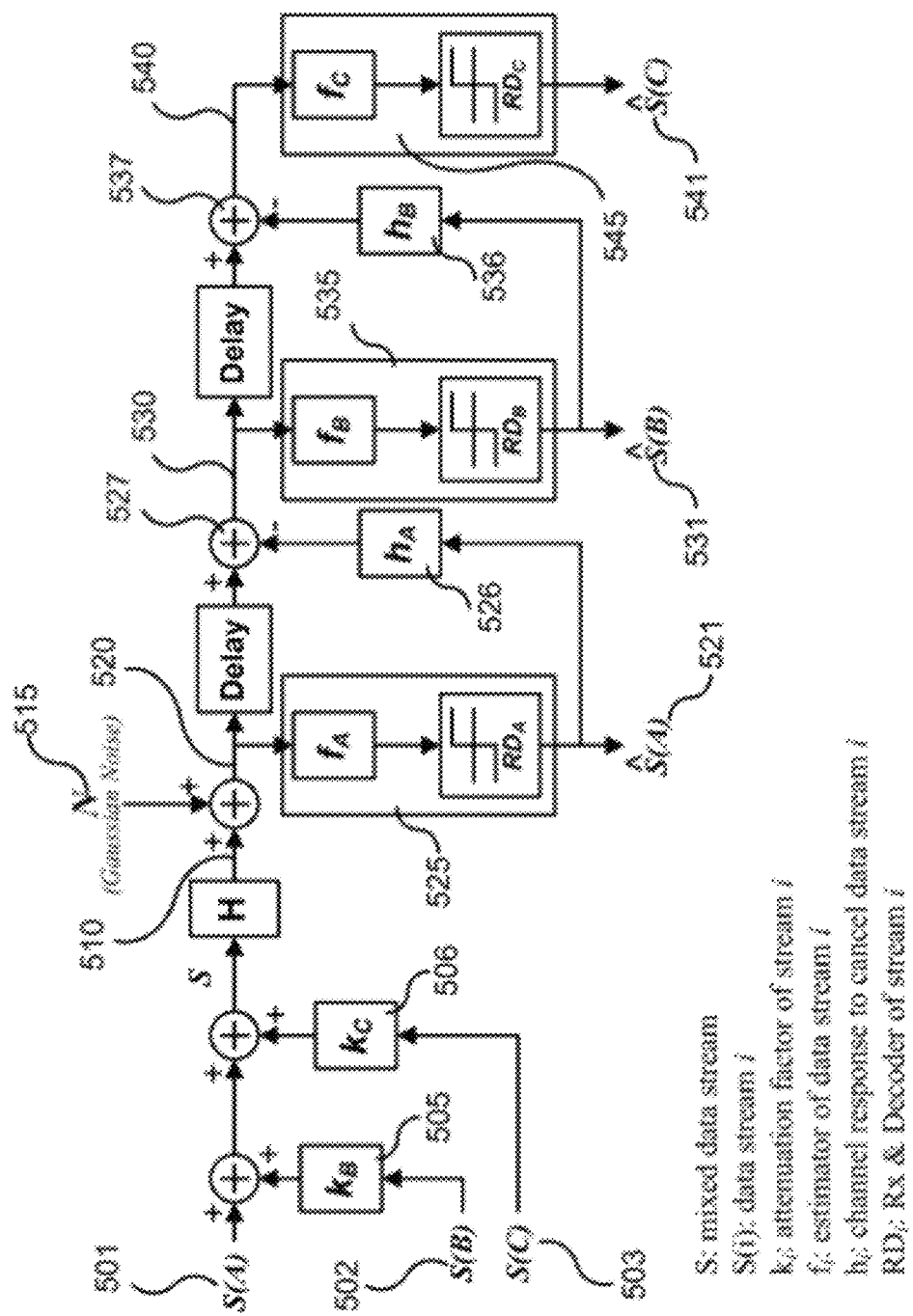
FIG. 5 is a simplified block diagram for a multi-stream receiver.

Referring to FIG. 5, shown is a simplified block diagram for a multi-stream receiver. Three streams, S(A) 501, S(B) 502 and S(C) 503 are processed in processing blocks 505 and 506 and added together at a transmission end to form a transmit signal 510. The streams are each encoded and are at known signal levels one relative to another. The transmit signal is transmitted wirelessly from the transmission end and during transmission and propagation has an amount of noise 515 added thereto forming receive signal 520. S(A) 521 is then extracted from the signal 520 at 525 and provided via feedback 526 to be removed from the received signal at 527 to result in processed received signal 530. Extracted signal S(A) 521 comprises similar or identical data to signal S(A) 501. S(B) 531 is then extracted from the signal 530 at 535 and provided via feedback 536 to be removed from the received signal at 537 to result in processed received signal 540. Extracted signal S(B) 531 comprises similar or identical data to signal S(B) 502. S(C) 541 is then extracted from the signal 540 at 545. Extracted signal S(C) 541 comprises similar or identical data to signal S(C) 503. As long as S(A) and S(B) can be reliably extracted, S(C) should be extractable from the signal even when transmitted at a lower power.

Figure 6:
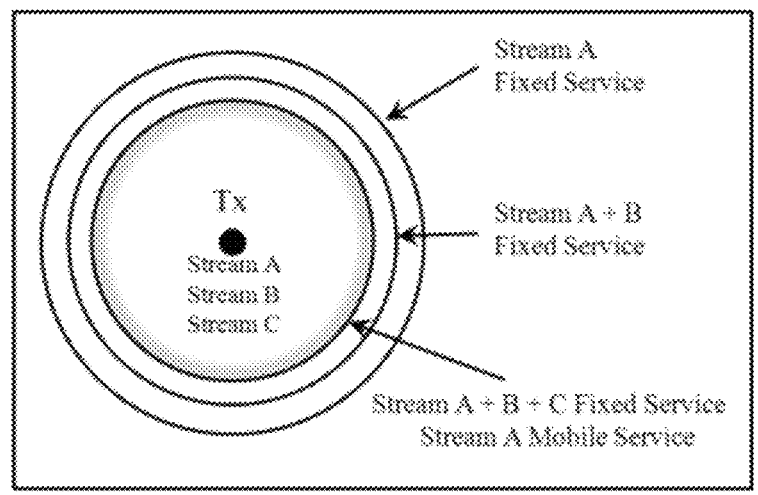
FIG. 6 is a simplified diagram of areas of transmission for a three stream system.

FIG. 6 presents coverage/service for a Network with three Streams A, B, and C. There are four service contours: Stream A fixed service contour; Stream A+B fixed service contour; Stream A+B+C fixed service contour; and Stream A mobile service contour. Because Stream C is transmitted at a lower intensity than Stream A, it has a smaller service area than Stream A alone. That said, by providing opposite stream intensities on an adjacent transmitters, it is possible to provide for more efficient transmitter placement if required.

Figure 7:
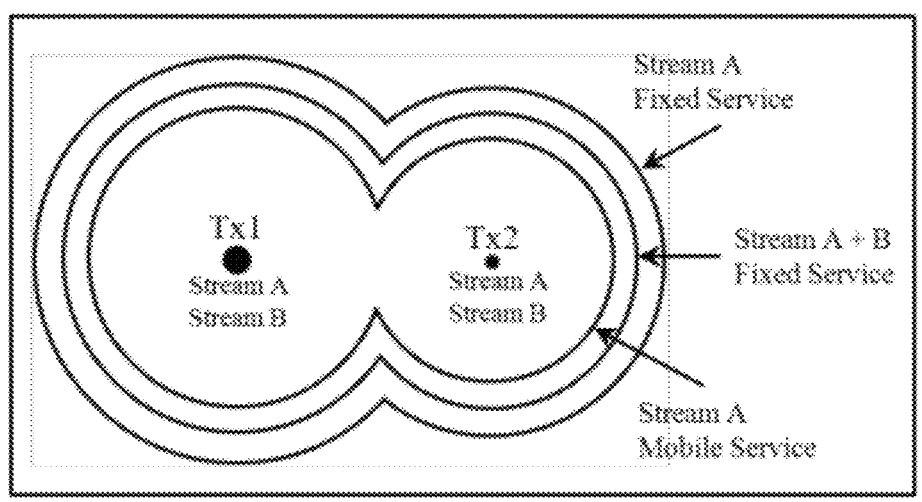
FIG. 7 is a simplified diagram of overlapping areas of transmission for a two stream system.

FIG. 7 shows network coverage for a conventional SFN network with two streams, A and B. The two transmitters emit identical Stream A signals and identical Stream B signals. The two streams, A and B, result in three service contours: Stream A fixed service contour; Stream A+B fixed service contour; and Stream A mobile service contour. In this example, all three service contours of the two transmitters are overlapping in the middle areas between the two transmitters.

Figure 8A:
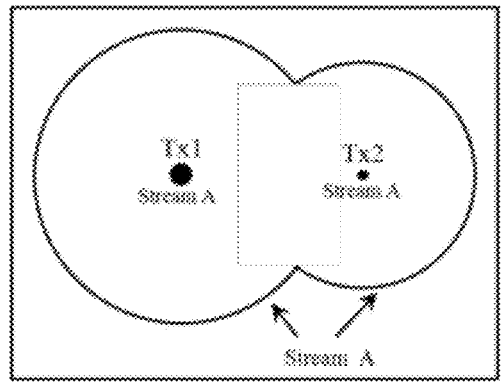
FIG. 8A is a simplified diagram of overlapping areas of transmission for a one stream system wherein their coverage contours overlap to deliver the same program, seamlessly.
Figure 8B:
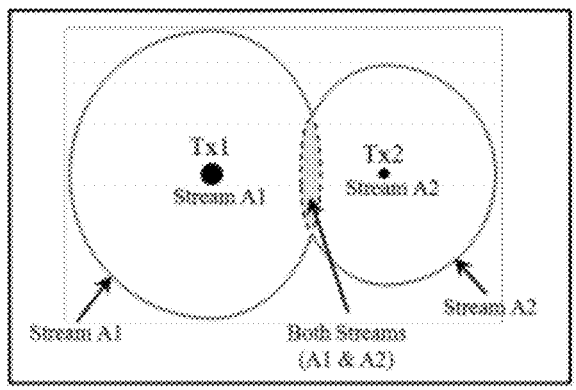
FIG. 8B is a simplified diagram of overlapping areas of transmission for a one stream system wherein there is a small overlapping area where both programs are received and optionally either is decoded.

FIGS. 8A, 8B and 8C show comparative coverage for two types of SFN: a conventional SFN and an SFN according to the present embodiment. For the conventional SFN, the two transmitters emit identical signals and their coverage contours overlap to deliver the same program, seamlessly, as shown in FIG. 8A. In an SFN according to the present embodiment, the two transmitters emit different signals: Stream A1 and A2. Each provides coverage for its own programming. There is a small overlapping area where both programs are received and optionally either is decoded. The size of the overlapping area depends on a system topology, implementation, and threshold—the more negative threshold value the system has, the larger the overlapping area supported, e.g., a −5 dB threshold system supports a larger overlapping area than that supported by a −2 dB system. Using a directional receiving antenna also allows increased overlapping area. A self-tuning smart antenna is a suitable choice in this environment.

Figure 9:
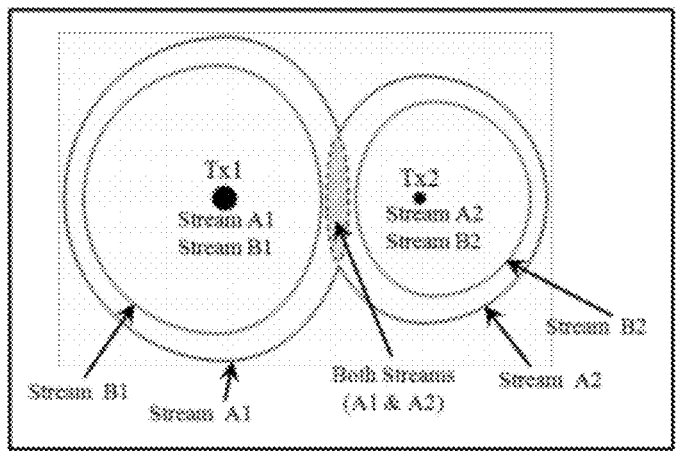
FIG. 9 is a simplified diagram of overlapping areas of transmission for a two stream system.

FIG. 9 demonstrates service contours for an SFN according to the present embodiment using two transmitters emitting different programs within each transmitter location. Each transmitter has two streams which are different one from an other, and also different from the streams of the other transmitter. The streams are labelled A1, B1—from a first transmitter location—and A2, B2—from a second transmitter location. Coverage contours for Streams A1 and A2 are the same as shown in FIGS. 8A, 8B and 8C. Each transmitter has its own program coverage contour and there is an overlapping area wherein both Stream A1 and A2 are available for reception. The coverage contours for B1 and B2 are not overlapping, because the receiving thresholds for Stream B1 and B2 are not a negative dB value. However, if directional receiving antennas are used, overlapping areas are more readily supported, where both Streams B1 and B2 are receivable.

Figure 10A:
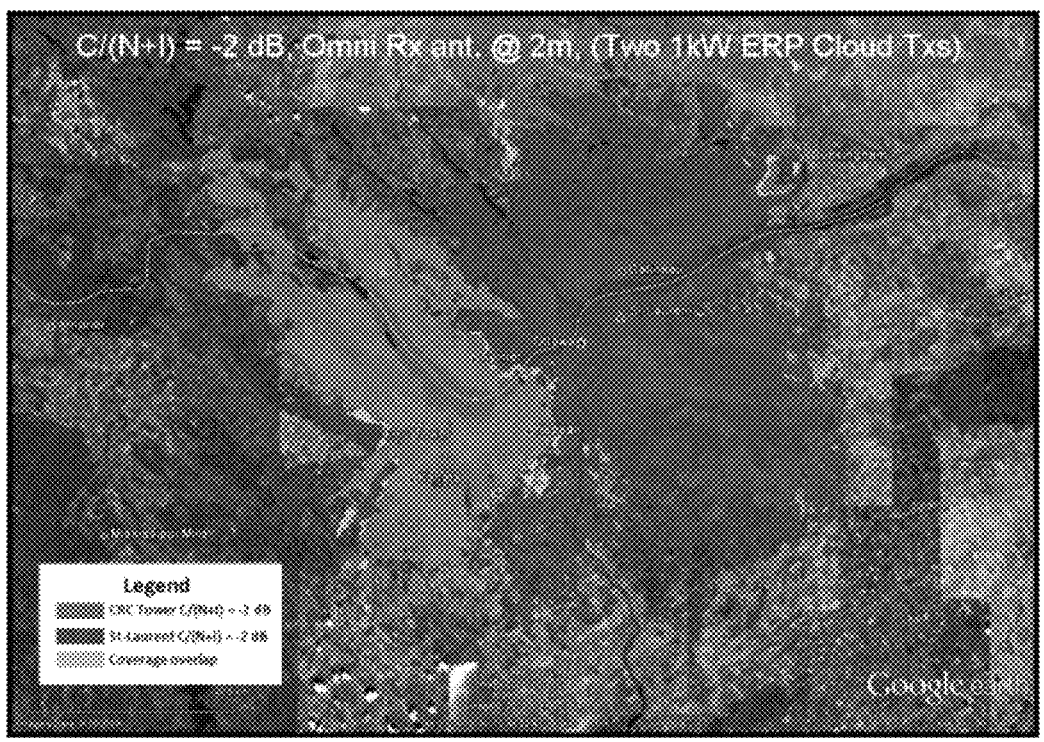
FIG. 10A is a coverage prediction map for a one stream system where the one stream is different from each transmitter and Omni-directional receiving antennas were assumed.
Figure 10B:
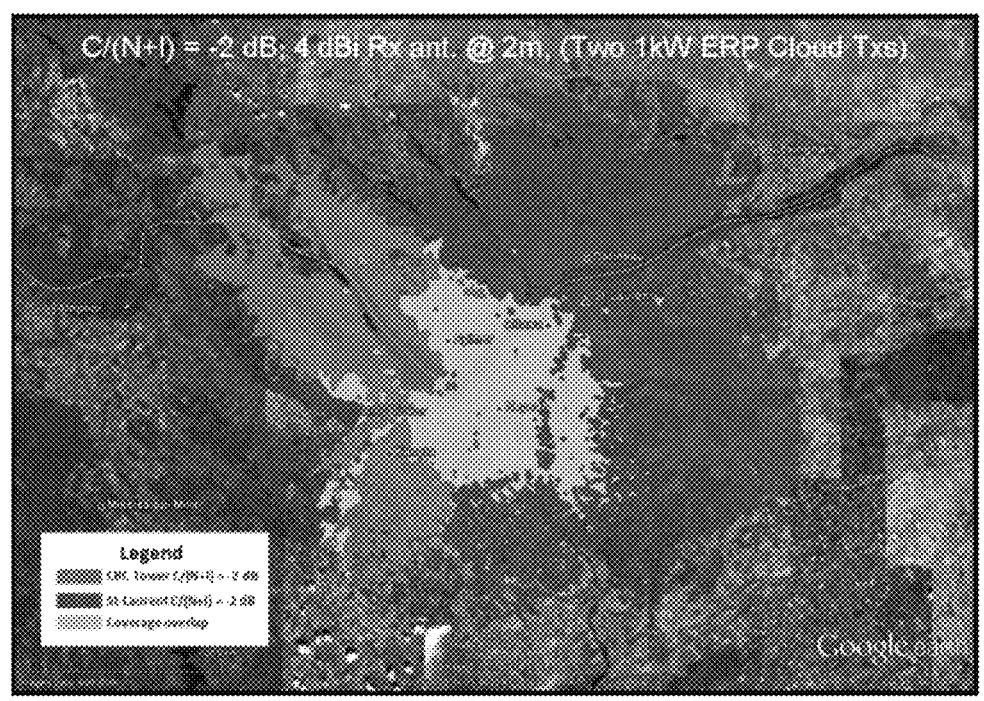
FIG. 10B is a coverage prediction map for a one stream system where the one stream is different from each transmitter and receiving antennas were assumed.

FIGS. 10A and 10B provide computer simulation coverage predictions for an SFN according to the present embodiment with two transmitters, one emitting Stream A1 and the other A2. For these simulations, CRC COVLAB software, along with terrain elevation and terrain type databases for the Ottawa area, in Ontario Canada were used. The two transmitters were disposed as follows: one located east of Ottawa Downtown (77 m AGL, 1 kW ERP) and the other located at CRC, west of Ottawa (76-m AGL, 1 kW ERP). Transmitter spacing is 22 km (14 miles). In FIG. 10A, Omni-directional receiving antennas were assumed. It can be seen that each transmitter has its own coverage area. The "yellow" areas represent overlapping areas where both Streams A1 and A2 can be received. In FIG. 10B, 4 dBi receiving antennas are assumed for reception. It can be seen that the "yellow" areas makes up much more of the coverage area. About ⅓ of Streams A1 and A2 coverage areas are now overlapped. The coverage radii for the two transmitters are also increased, due to the use of the 4 dBi receiving antenna. The coverage contours shown in these simulations resemble those shown for Layer 1 Streams A1 and A2 in FIG. 8B and FIG. 9.

Figure 11A:
FIG. 11A is a coverage prediction map for a one stream system where a first stream is emitted.
Figure 11B:
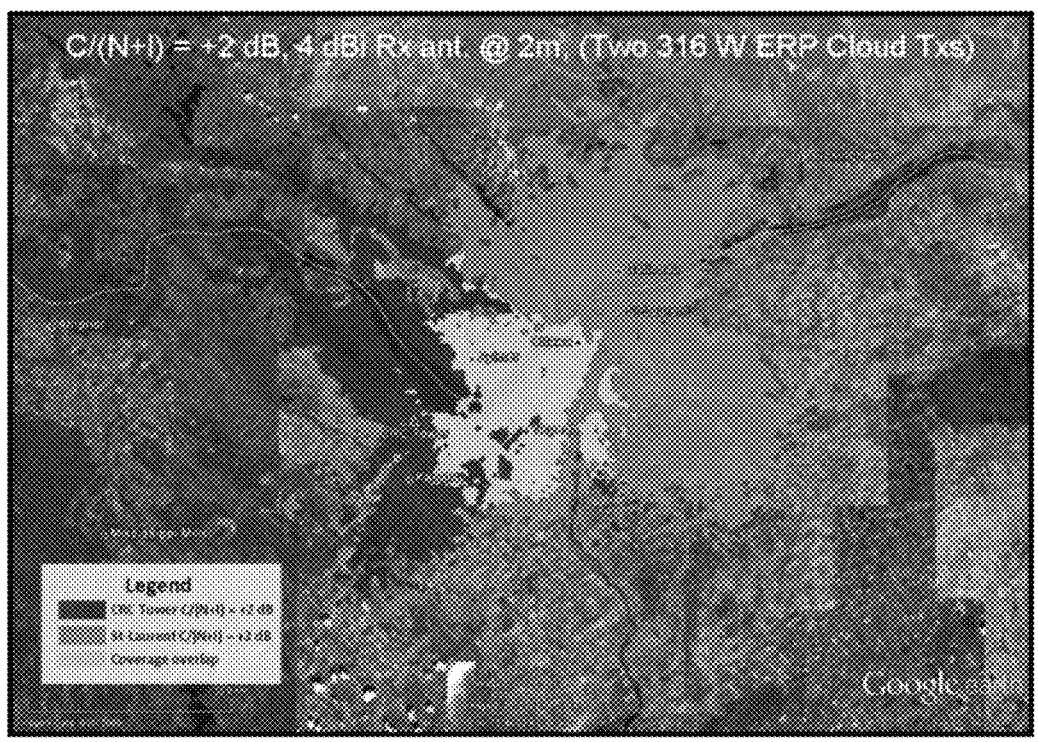
FIG. 11B is a coverage prediction map for a one stream system where a second stream is emitted.

FIGS. 11A and B provide computer simulations for the coverage of an SFN according to the present embodiment with two transmitters, one emitting Stream B1 and the other B2. The coverage contours resemble those shown for Layer 2 streams B1 and B2 in FIG. 9. However, to obtain such coverage, the upper layer stream—A1 or A2—is cancelled from the received signal by 15 dB or more using signal processing techniques. Under these conditions, a spectrum efficiency of at least 1 bit/s/Hz is obtained for the second layer.

For these simulations, the power of each of the two transmitters was assumed to be 316 W ERP—5 dB below stream A—and the coverage contours are for C/(N+I)=+2 dB. All other conditions are the same as those for the simulation results shown in FIGS. 10A and B. FIG. 11A represents the coverage for an Omni-directional receiving antenna, and 10B for a 4 dBi gain directional receiving antenna with a front to back ratio of at least 15 dB. As mentioned earlier in this section, because the receiving thresholds for Stream B1 and B2 are not negative, their coverage contours do not overlap in the present embodiment except when directional antennas are used for reception.

Figure 12A:
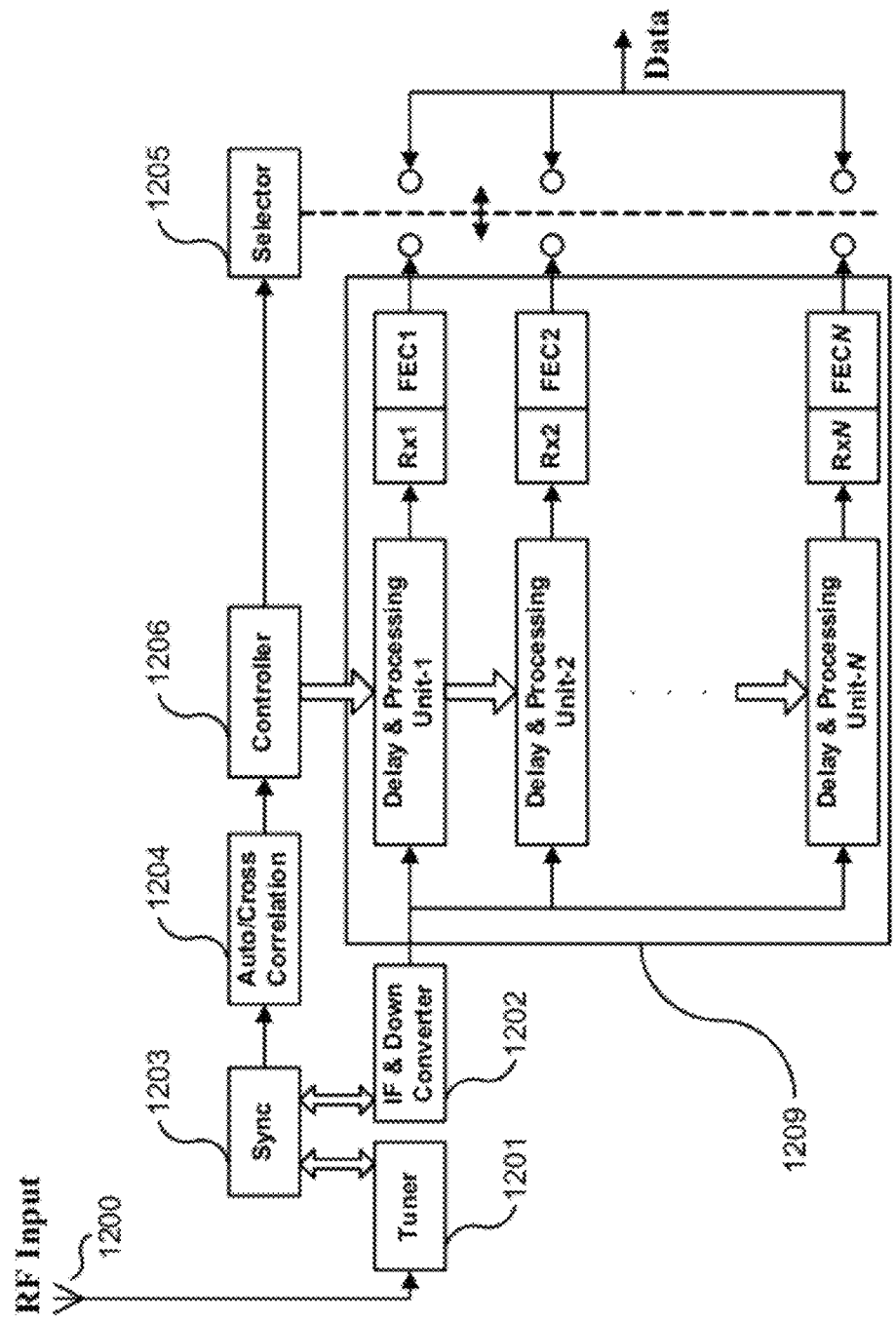
FIG. 12A is a simplified diagram of a receiver architecture relying on a moving window of received data to calculate an auto-correlation function.

Since the proposed system receiver does not require equalization, optionally receiver implementation is quite simple. FIG. 12A presents a first embodiment of a receiver architecture, Receiver Architecture I, relying on a moving window of received data to calculate an auto-correlation function.

An RF signal is received at antenna 1200. The signal is processed by tuner 1201, down converter 1202, and sync block 1203. The resulting signal is provided for autocorrelation processing in autocorrelation/cross correlation block 1204.

The largest two or more coefficients within an auto-correlation function are used as synchronization points to start a signal decoding process. These coefficients represent two or more incoming signals or signal paths. A selection circuit 1205 is implemented to select a receiver-element output signal after error correction. When signals from different transmitters or signal paths vary in a mobile environment, the auto-correlation coefficients reflect a signal change. As long as the receiver-elements track the few strong signal paths, reception should be successful. This receiver design is suitable for stationary and mobile reception.

Similar to the above-described embodiments, controller 1206 controls signal extraction of N signals shown in block 1209. The signals are reflective of multipath delays and of different or separate signals received at the antenna 1200. For example, two signal paths for a same signal are received and a second other signal is received from a separate transmitter. Thus, three signals are decodable. Selector circuit 1205 is relied upon to select a signal of interest from a plurality of decoded signals. For example, the signal with the highest amplitude is selected. Alternatively, signals are encoded differently for identification thereof and a specific signal is selected. Further alternatively still, switching between signals is supported.

Figure 12B:
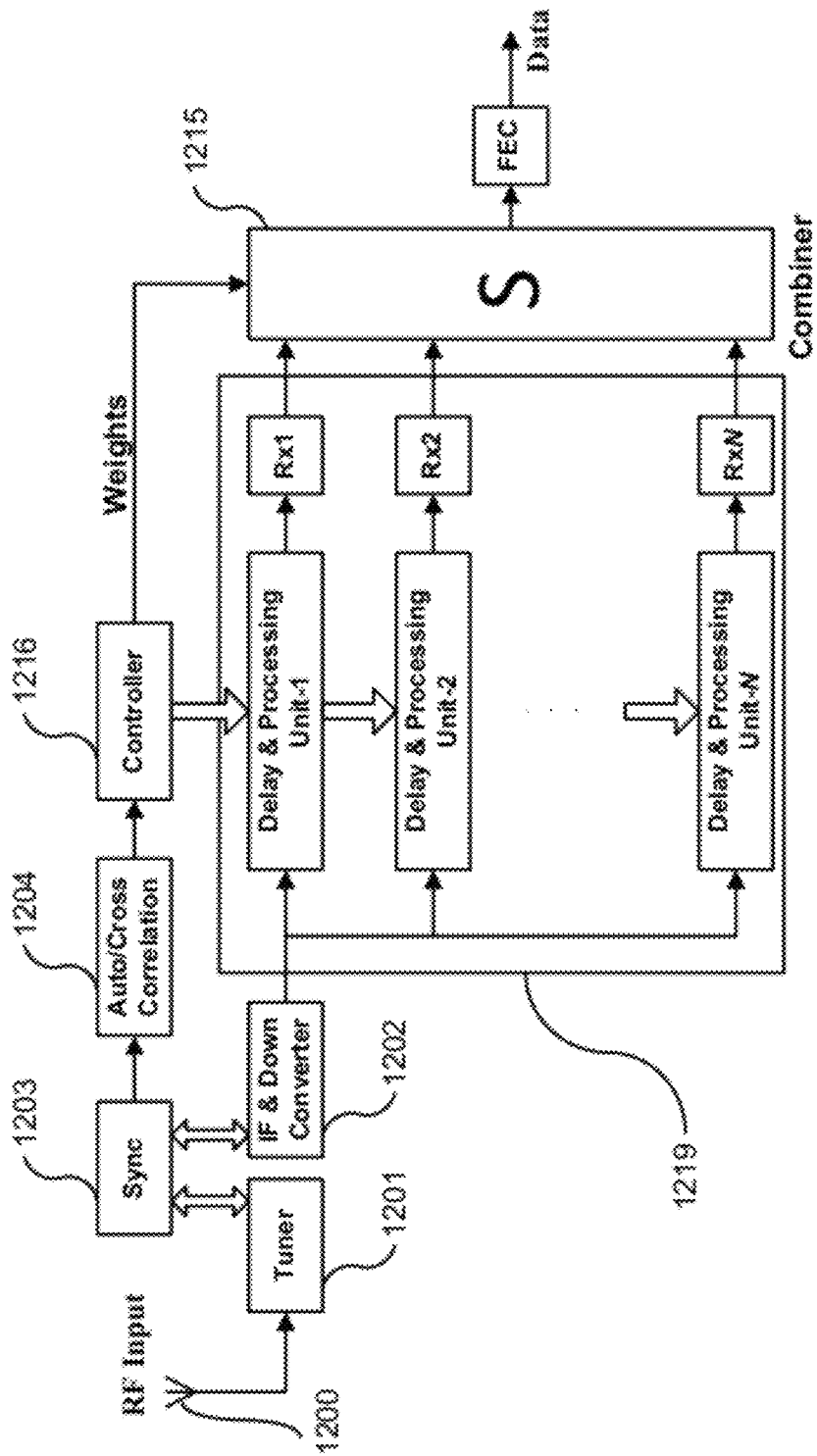
FIG. 12B is a simplified diagram of a receiver architecture, where a combining process is implemented to combine soft output values of receiver-elements and apply them to an error correction code.

FIG. 12B shows another embodiment of a receiver architecture, Receiver Architecture II, where a combining process, for example Maximal Ratio Combining (MRC), is implemented to combine soft output values of receiver-elements and apply them to an error correction code. This receiver design is similar to rake receivers used in the direct spread spectrum system. It often improves received signal SNR and only uses one FEC decoder, but it relies upon a detecting and combining system. Generally, it is thought to perform better than Receiver Architecture I.

An RF signal is received at antenna 1200. The signal is processed by tuner 1201, down converter 1202, and sync block 1203. The resulting signal is provided for autocorrelation processing in autocorrelation/cross correlation block 1204.

The largest two or more coefficients within an auto-correlation function are used as synchronization points to start a signal decoding process. These coefficients represent two or more incoming signals or signal paths. A combiner circuit 1215 is implemented to apply weighting of soft output values from a signal extraction block 1219. When signals from different transmitters or signal paths vary in a mobile environment, the auto-correlation coefficients reflect a signal change. As long as the receiver-elements track the few strong signal paths, reception should be successful. This receiver design is suitable for stationary and mobile reception.

Similar to the above-described embodiments, controller 1216 controls signal extraction of N signals shown in block 1219. The extracted signals reflect soft values for being provided to combiner 1215.

Figure 12C:
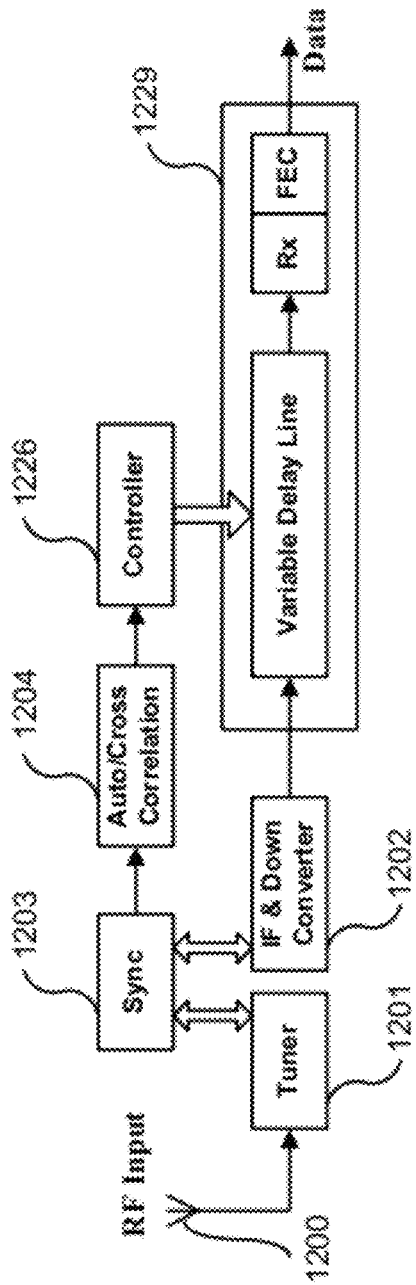
FIG. 12C is a simplified diagram of a receiver architecture, where one receiver-element is synchronized to a largest coefficient in the auto-correlation function indicative of a strongest signal path.

FIG. 12C displays another embodiment of a receiver architecture, Receiver Architecture III, where one receiver-element is synchronized to a largest coefficient in the auto-correlation function indicative of a strongest signal path. A controller 1226 is used to monitor the coefficients in the auto-correlation function. If another co-efficient grows larger than the one that the receiver-element was synchronized to, the controller 1226 switches the receiver-element to the new strong path signal. In this receiver design, only one receiver-element is needed, and a controller replaces multiple receiver-elements. This receiver design is the simplest and will provide performances comparable to Receiver I. This receiver is also very useful for single signal non-mobile applications.

An RF signal is received at antenna 1200. The signal is processed by tuner 1201, down converter 1202, and sync block 1203. The resulting signal is provided for autocorrelation processing in autocorrelation/cross correlation block 1204.

The largest coefficient within an auto-correlation function is used as synchronization points to start a signal decoding process. This coefficient represents a single incoming signal. As long as the receiver-elements track the strongest signal path, reception should be successful. Similar to the above-described embodiments, controller 1226 controls signal, but in contrast, only a single signal is extracted as indicated by controller 1226.

Figure 12D:
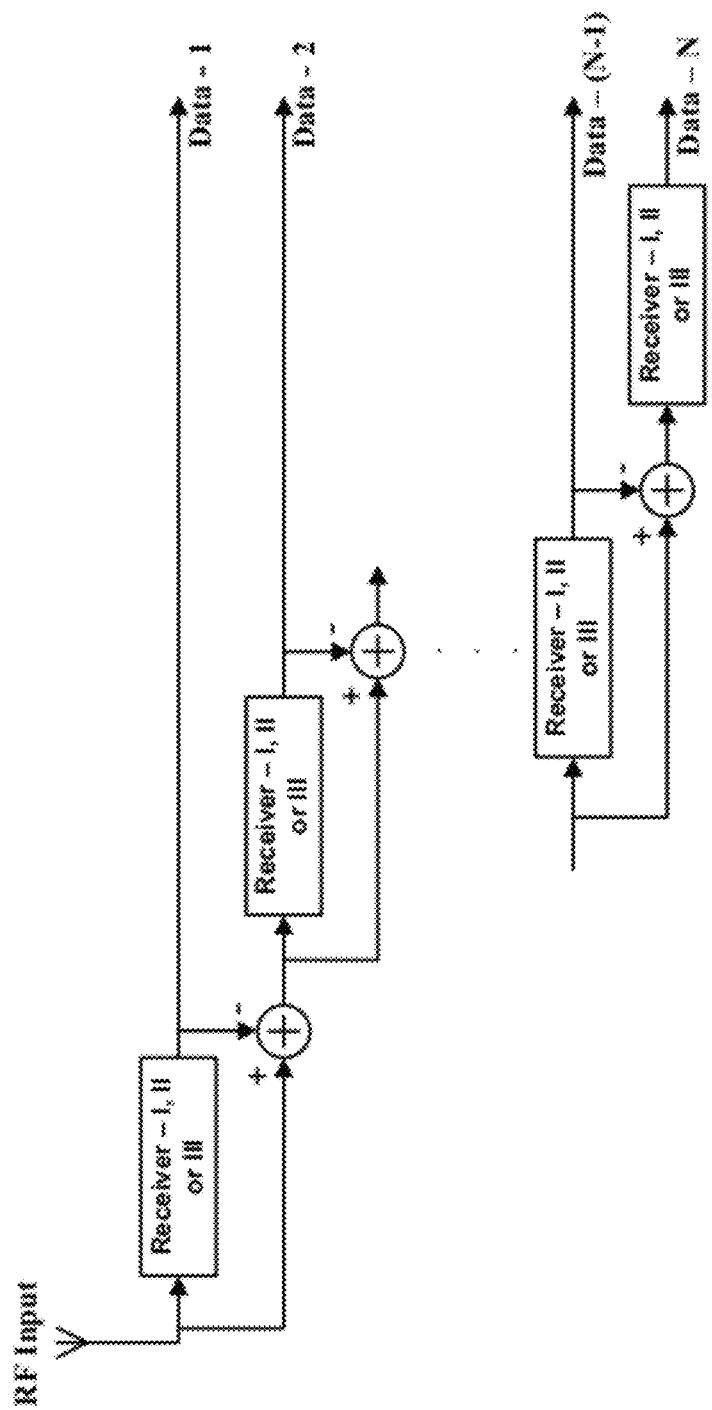
FIG. 12D is a simplified diagram of a receiver architecture where the receiver design implements two receivers selected from available receiver designs and an adaptive signal feedback and cancellation system.

FIG. 12D shows a block diagram of a yet another embodiment of a receiver architecture, Receiver Architecture IV. This receiver design implements two receivers selected from available receiver designs, for example, from those previously described above, and an adaptive signal feedback and cancellation system. A first receiver tunes in to a highest strength signal path and successfully decodes that signal. The decoded signal is then used to cancel the strong signal from the received signal to result in a modified received signal. The modified received signal is then provided to a second receiver to decode another weaker signal therefrom. Optionally, further cancellation and further receivers are implemented for further decoding even weaker signals. Receiver IV is useful when more than one signal or data stream is transmitted from a same or proximate transmission towers.

With the advance of signal cancellation techniques described above, additional programs and services can be added to a same RF channel to improve the spectrum efficiency. This allows a network and services to evolve over time by supporting future more sophisticated technologies for more efficiently using spectrum or for differently using spectrum. For example, when a network is set up, only one program is transmitted from each transmitter. When further bandwidth is needed or signal cancellation technology is further matured, more programs are added from the same transmitter/tower. At the beginning, the new program should be emitted at a power level that is a few dB below the old program, so that it will not impact the operation of the legacy receivers. Some years later, when more advanced receivers are widely available, all programs can transmit at a same or similar power level. This process renders a network flexible, scalable and evolutionary towards more efficient use of the spectrum.

Figure 13A:
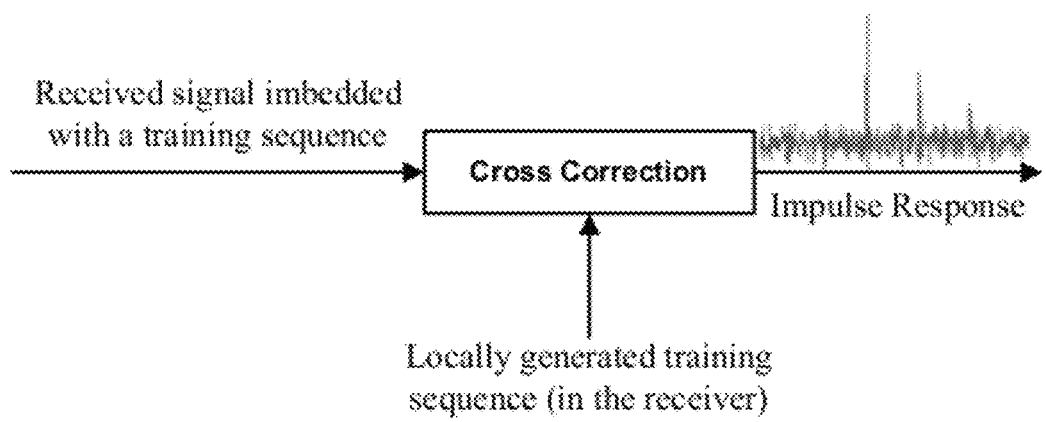
FIG. 13A shows a simplified diagram of an impulse response calculated using the received signal embedded with a training sequence.
Figure 13B:
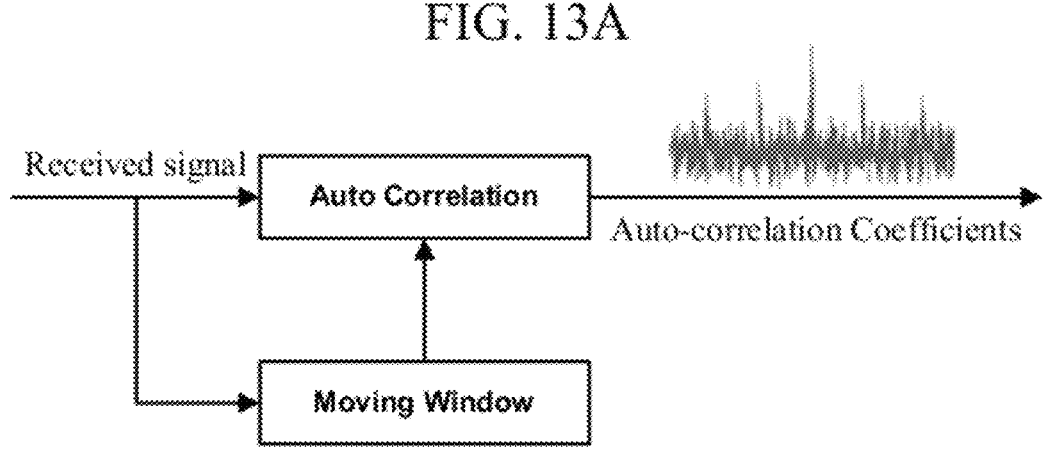
FIG. 13B shows a simplified diagram of a moving window in the received signal used to calculate an auto-correlation.

In the above-described receiver, auto-correlation rather than impulse response is used to track signal variation. In prior art receivers, impulse response is calculated using the received signal embedded with a training sequence as shown in FIG. 13A. A cross-correlation is then performed with a receiver's locally generated training sequence. This process requires the insertion of the training sequence in the transmitted signal, which reduces data throughput. To track fast changing mobile channels, the training sequence is inserted frequently, noticeably reducing the data rate. In a conventional system receiver, the impulse response is needed to assist the channel equalization so its use makes sense as it imposes little or no further overhead. Since the above-described system is absent an equalizer, calculating the impulse response for equalization is obviated. In the proposed embodiments, a moving window in the received signal is used to calculate an auto-correlation as shown in FIG. 13B. This process is repeated over time and is used to track signal variation within a mobile channel with sufficient accuracy for correct operation of the receiver. Of course, an impulse response is also suitable to this function.

In an embodiment, transmitters emit identical signals. Alternatively, different signals are emitted. Further alternatively a combination of same and different signals are emitted. Different transmitters benefit from RF frequency locking, though even this limitation is optional depending on the encoding, decoding and other parameters of the overall system. It is not necessary to lock the signal phase while a receiver only synchronizes to, and decodes a strongest signal. The transmitter emission time control therefore optionally is somewhat trivial. This makes operation of a network as described above optionally simpler and more cost effective as compared to that of conventional single frequency networks.

For example, because the impact of multipath distortion is obviated, a nation-wide single frequency network is implementable using a single large cell, to distribute same content. Alternatively, since the co-channel interference is a less significant problem, it is also viable to construct a nation-wide single frequency network, where each transmitter broadcasts slightly different—different advertisement content, or completely different programs for local coverage. Spectrum reuse, therefore, is viable and is optionally allocated at will. Thus, network planning and configuration activities are optionally simplified. One can also build mixed conventional single frequency networks with some of the present embodiments, where certain content is distributed over the entire network, while the remaining capacity is dedicated to local broadcasting.

As far as modulation—single carrier vs. multi-carrier—is concerned, preliminary studies have shown that a major advantage of using a multi-carrier modulation system (OFDM), which is robust against multipath distortion, might not be as advantageous for the first layer of S(A). This is because multipath distortion is not currently a major problem for this layer. However, an OFDM system may be advantageous; for example, it may support a little more spectrum efficiency. Meanwhile, for channel bonding and aggregation, using OFDM might be much easier and more flexible. Of course, other modulation processes are also supported, as are different modulation processes for different transmissions.

Optionally, transmission towers are located anywhere in the designated coverage area without concern for co-channel interference and SFN multipath distortion delay spread. Optionally, different programs are broadcast from different single frequency network transmission towers for supporting local programming or advertisement. Optionally, lower power signals transmitted from a same antenna relate to additional data for use with the higher power signals. For example, the high power signal relates to standard definition television broadcast signals while the lower power signals enhance a quality of the video data to higher definition.

Numerous other embodiments may be envisaged without departing from the scope of the invention.

What is claimed is:

1. A transmitter for transmitting signals to a receiver comprising:
at least a first port for receiving a first data signal and a second data signal;
an encoder for separately encoding the first data signal and the second data signal with different channel coding and modulation schemes and the same carrier frequency to provide first and second modulated signals and for combining the first and second modulated signals into a combined signal, wherein the first and second modulated signals are configured with a pre-configured power ratio and wherein the first signal has a higher power than the second signal to allow a receiver to detect the first signal without having information related to the second modulated signal, wherein the channel coding and modulation scheme of the first higher power signal is configured to provide the first higher power signal with an SNR threshold of less than 0 dB, so that the first signal is decodable by the receiver when the first higher power modulated signal has a signal-to-noise ratio (SNR) less than 0 dB, and wherein the second lower power modulated signal is configured to be decodable by the same receiver, wherein the SNR threshold is the SNR above which the receiver can successfully decode the signal, and wherein the first and second modulated signals are frequency locked and clocked synchronized.

2. A transmitter as defined in claim 1 wherein the SNR threshold of the first signal is configured to be between 0 dB and −5 dB.

3. A transmitter as defined in claim 1 wherein the SNR threshold of the first signal is configured to be in the range of −2 dB and −5 dB.

4. A transmitter as defined in claim 2, wherein the power of the first signal is at least 5 dB above the second signal.

5. A transmitter as defined in claim 1 wherein the first signal and the second signal are different signals comprising different data content.

6. A transmitter as defined in claim 1, wherein the combined signal formed from the first and second signal is transmitted from a single antenna.

7. A system having a plurality of transmitters for transmitting signals to a receiver, each transmitter comprising:
at least a first port for receiving a first data signal and a second data signal;
an encoder for separately encoding the first data signal and the second data signal with different channel coding and modulation schemes and the same carrier frequency to provide first and second modulated signals and for combining the first and second modulated signals into a combined signal, wherein the first and second modulated signals are configured with a pre-configured power ratio and wherein the first signal has a higher power than the second signal to allow a receiver to detect the first signal without having information related to the second modulated signal, wherein the channel coding and modulation scheme of the first higher power signal is configured to provide the first higher power signal with an SNR threshold of less than 0 dB, so that the first signal is decodable by the receiver when the first higher power modulated signal has a signal-to-noise ratio (SNR) less than 0 dB, and wherein the second lower power modulated signal is configured to be decodable by the same receiver, wherein the SNR threshold is the SNR above which the receiver can successfully decode the signal, and wherein the first and second modulated signals are frequency locked and clock synchronized, and wherein the plurality of transmitters use the same carrier frequency.

8. A system as defined in claim 7, wherein the second lower power modulated signal is configured to be decodable by the same receiver at signal to noise ratio greater than 0 dB, and wherein the data throughput of the second signal is higher than the data throughput of the first higher power signal.

9. A method of transmitting a plurality of signals to a plurality of receivers from a transmitter, comprising:
receiving at the transmitter, a first data signal and a second data signal;
within the transmitter, separately encoding the first data signal and the second data signal with different channel coding and modulation schemes and the same carrier frequency to provide first and second modulated signals and for combining the first and second modulated signals into a combined signal;
within the transmitter, configuring the first and second modulated signals with a pre-configured power ratio so that the first signal has a higher power than the second signal to allow a receiver to detect the first signal without having information related to the second modulated signal wherein the channel coding and modulation scheme of the first higher power signal is configured to provide the first higher power signal with an SNR threshold of less than 0 dB, so that the first signal is decodable by the receiver when the first higher power modulated signal has a signal-to-noise ratio (SNR) less than 0 dB, and wherein the second lower power modulated signal is configured to be decodable by the same receiver, wherein the SNR threshold is the SNR above which the receiver can successfully decode the signal, and
within the transmitter frequency locking and clock synchronizing the first and second modulated signals.

10. A method of transmitting a plurality of signals to a plurality of receivers from a plurality of transmitters, comprising:
each transmitter:
receiving a first data signal and a second data signal;
separately encoding the first data signal and the second data signal with different channel coding and modulation schemes and the same carrier frequency to provide first and second modulated signals and for combining the first and second modulated signals into a combined signal;
configuring the first and second modulated signals with a pre-configured power ratio so that the first signal has a higher power than the second signal to allow a receiver to detect the first signal without having information related to the second modulated signal wherein the channel coding and modulation scheme of the first higher power signal is configured to provide the first higher power signal with an SNR threshold of less than 0 dB, so that the first signal is decodable by the receiver when the first higher power modulated signal has a signal-to-noise ratio (SNR) less than 0 dB, and wherein the second lower power modulated signal is configured to be decodable by the same receiver, wherein the SNR threshold is the SNR above which the receiver can successfully decode the signal, and
within the transmitter frequency locking and clock synchronizing the first and second modulated signals, wherein the plurality of transmitters use the same carrier frequency.

* * * * *